United States Patent [19]

Kennedy et al.

[11] Patent Number: 4,893,703
[45] Date of Patent: Jan. 16, 1990

[54] ELECTROMAGNETIC CONTROL ASSEMBLY AND METHOD FOR A VISCOUS FLUID FAN CLUTCH

[75] Inventors: Lawrence C. Kennedy, Kettering; James O. Strader, Spring Valley, both of Ohio

[73] Assignee: General Motors Corporation, Detroit, Mich.

[21] Appl. No.: 355,538

[22] Filed: May 22, 1989

[51] Int. Cl.[4] .............................................. F16D 33/12
[52] U.S. Cl. ................................ 192/58 B; 192/82 T; 123/41.12
[58] Field of Search ............................ 192/58 B, 82 T; 123/41.12

[56] References Cited

U.S. PATENT DOCUMENTS

| | | | |
|---|---|---|---|
| 3,552,532 | 1/1971 | Thomas et al. | 192/82 T |
| 4,271,945 | 6/1981 | Budinski | 192/58 B |
| 4,458,798 | 7/1984 | Bopp | 192/82 T |
| 4,591,037 | 5/1986 | Bopp | 192/82 T |
| 4,741,421 | 5/1988 | Johnston | 192/82 T |
| 4,823,744 | 4/1989 | Omura | 123/41.12 |

*Primary Examiner*—Rodney H. Bonck
*Assistant Examiner*—Nicholas Whitelaw
*Attorney, Agent, or Firm*—A. Michael Tucker

[57] ABSTRACT

A fan clutch assembly for a vehicle includes an electromagnetic control assembly for actuating a rotatable valve plate. A rotatable shaft is connected to the valve plate. A ferromagnetic element is slidably mounted on the shaft. When an electromagnetic coil is energized, the resulting flux attracts the ferromagnetic element. As the ferromagnetic element slides, it is rotated to cause rotation of the shaft, thereby opening the valve plate.

4 Claims, 2 Drawing Sheets

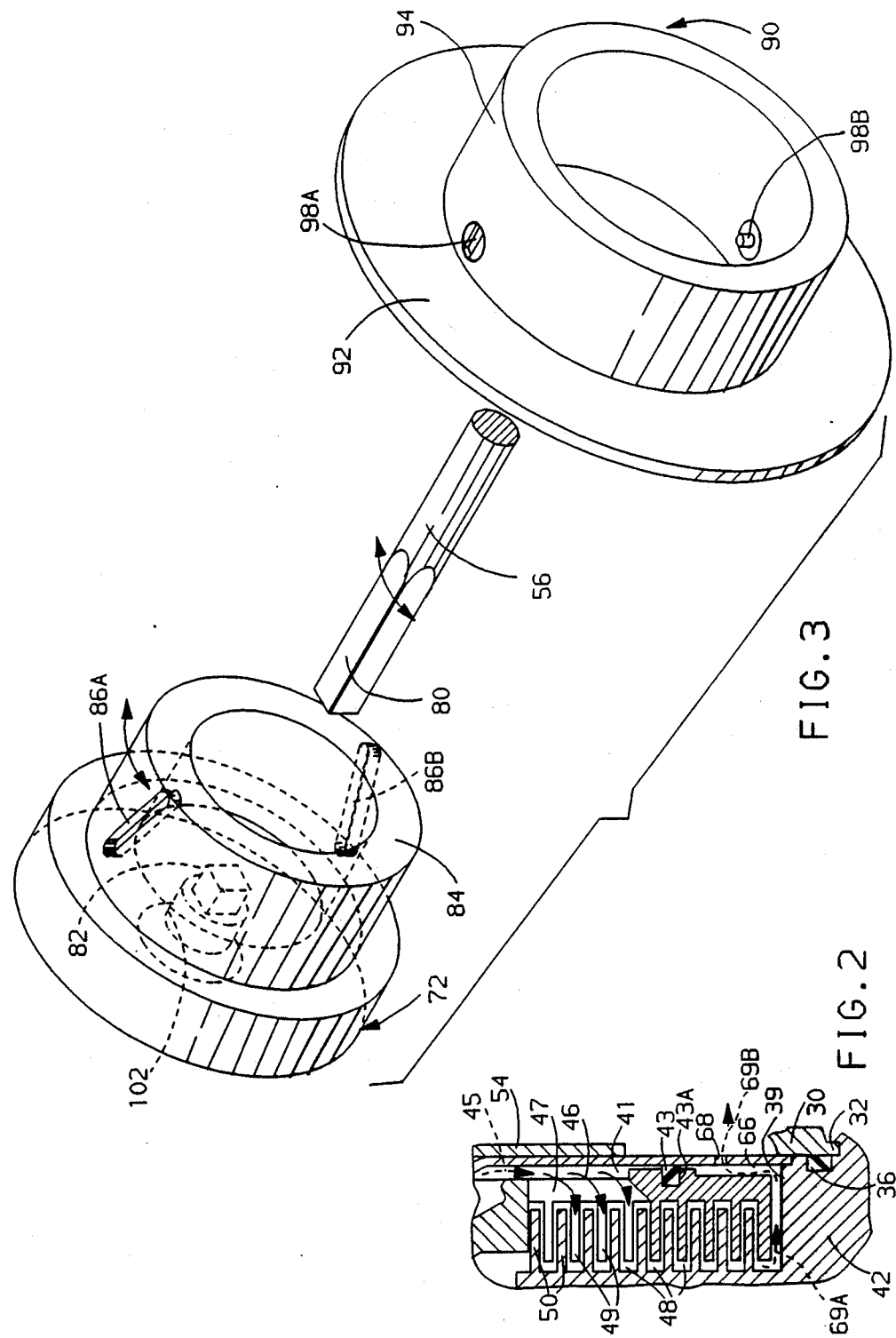

ELECTROMAGNETIC CONTROL ASSEMBLY AND METHOD FOR A VISCOUS FLUID FAN CLUTCH

BACKGROUND OF THE INVENTION

1. Field of the Invention

The present invention relates generally to a viscous fluid coupling device. In particular, the present invention is concerned with an electromagnetic control assembly of a viscous fluid fan clutch for a vehicle.

2. Statement of the Related Art

A viscous fluid clutch assembly for driving and rotating a vehicle cooling fan is well-known. A multi-bladed fan is removably secured to a clutch body of the assembly. The fan and clutch assembly are installed between an accessory pulley of a vehicle engine (typically the water pump pulley) and a radiator. The clutch assembly drives the fan at high speeds close to input speed when cooling is required and permits the fan to rotate at low speeds when cooling is not required.

Typically, a clutch assembly utilizes a control device to vary the speed of the fan. When cooling is required, the control device causes the torque from an input shaft to be transferred to the attached fan. When cooling is not required, the input torque is not transferred to the fan, thereby reducing the load on an engine and improving efficiency.

In many clutch assemblies, a helically-wound bimetallic coil is utilized as a control device for changing the speed of a fan. Ambient air temperature causes winding and unwinding of the bimetallic coil so as to rotate a valve plate and control flow of fluid inside the clutch assembly. When fluid gates are opened, fluid travels to a shear zone so that fluid shear transmits input torque to the fan. When fluid gates are closed, the majority of fluid is pumped out of the shear zone and the fan speed is reduced. A representative example of this type of fan clutch can be found in U.S. Pat. No. 4,741,421.

The art continues to seek improvements. To improve efficiencies, it is desirable to monitor the temperature of an engine coolant fluid. When the temperature of a coolant fluid reaches a predetermined level, the engine cooling fan should be actuated. It is desirable that a viscous fluid clutch assembly include a control device for controlling the speed of a fan based on the temperature of the engine coolant fluid and other strategically-monitored temperatures.

SUMMARY OF THE INVENTION

The present invention includes a viscous fluid drive device particularly adaptable for a fan clutch assembly of a vehicle. The present fan clutch assembly utilizes an electromagnetic control assembly to control the flow of fluid inside the clutch assembly and the speed of a cooling fan. Various sensors can be strategically placed in an engine compartment and connected to an electronic control module or computer to activate the electromagnetic control assembly. When cooling is desired, a sensor can send a signal to the computer to activate the present electromagnetic control assembly to engage the clutch assembly and increase rotation of the fan.

The present invention includes a fan clutch assembly for a vehicle. The clutch assembly includes an electromagnetic control assembly for actuating a rotatable valve plate. A rotatable shaft is connected to the valve plate. A ferromagnetic element is slidably mounted on the shaft. When an electromagnetic coil is energized, the resulting flux attracts the ferromagnetic element. As the ferromagnetic element slides, it is rotated to cause rotation of the shaft, thereby opening the valve plate.

BRIEF DESCRIPTION OF THE DRAWINGS

FIG. 2 is an enlarged view of a portion of the clutch assembly of FIG. 1 wherein the pump plate has been rotated to illustrate fluid flow from a receiving chamber through the pump plate.

FIG. 3 is an exploded perspective view of a ferromagnetic barrel, an adapter and a chamfered shaft incorporated in the present electromagnetic control assembly.

DETAILED DESCRIPTION OF THE PREFERRED EMBODIMENT

Figure 1:
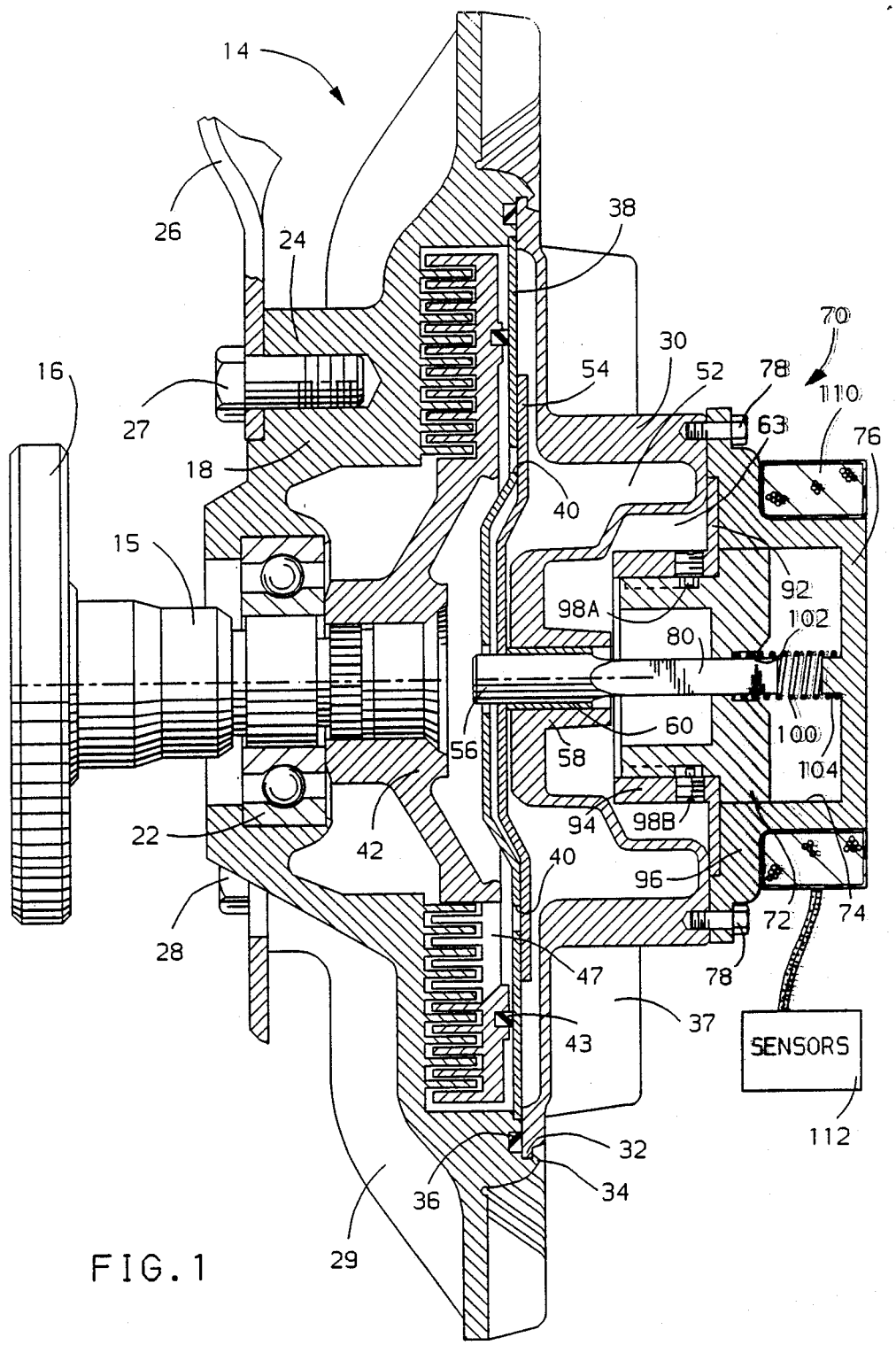
FIG. 1 is a sectional view through a viscous fluid fan clutch and blade assembly mounted on an input shaft and incorporating an electromagnetic control assembly of the invention.

FIG. 1 illustrates a multi-bladed fan and clutch assembly, indicated generally at 14, for drawing cooling air through the core of a vehicle radiator (not illustrated) through which engine cooling fluid is circulated. The fan and clutch assembly 14 is mounted on the outboard end of a rotatably driven shaft 15 whose inboard end terminates in a flange 16 which can be secured to a conventional engine-driven water pump pulley (not illustrated). The fan and clutch assembly 14 includes a dished main body 18 centrally mounted for rotation on shaft 15 by a bearing 22. The main body 18 is formed with a plurality of radially extending bosses 24 to which a multi-bladed fan 26 (partially illustrated in FIG. 1) is attached by threaded fasteners 27 and 28. A plurality of fins 29 is provided on the outer surface of the main body 18 to dissipate heat transferred from a viscous fluid housed by the assembly 14.

A cover plate 30 is mounted to a front face of and cooperates with the main body 18 to form a housing and reservoir as described below. The cover plate 30 is a dished member whose annular outer edge 32 is secured to the main body 18 by an annular retainer lip 34 spun over from the material of the main body 18. An annular seal 36, e.g. a formed-in-place gasket, is interposed between the edge 32 and the front face of the main body 18 to prevent leakage of the fluid from the interior of the assembly 14. A plurality of fins 37 is provided on the outer surface of the cover plate 30 to dissipate heat transferred from the fluid.

Disposed behind the cover plate 30 is a disk-like annular pump plate 38 whose diameter is slightly less than that of the cover plate 30. The pump plate 38 is drivingly secured to the main body 18 as it is trapped on an annular shoulder 39 (FIG. 2) on the main body 18 by the cover plate 30.

The pump plate 38 has a pair of diametrically opposed passages or gates 40 provided in its central portion. When opened, gates 40 allow the fluid to flow into a collecting chamber 41 (illustrated best in FIG. 2) formed and bounded by the pump plate 38, a clutch plate 42 and a divider ring 43. The clutch plate 42 is splined on shaft 15 at a central opening and provides for the hydraulic drive of the main body 18 and attached fan 26 as described below. Ring 43, preferably formed from TEFLON, is mounted in an annular groove 43A in the outer or front face of the clutch plate 42 and improves pump-out or clutch disengagement as described below. A divider ring of this type is described in U.S. Pat. No. 4,741,421, issued May 3, 1988, assigned to the assignee of this invention and hereby incorporated by reference.

As illustrated in FIG. 2, the centrifugal forces of the rotating assembly 14 force the axial fluid flow through gate 40 to radial fluid flow as indicated by directional arrows 45 into the collecting chamber 41.

Axial flow fluid, as indicated by directional arrows 46, is forced through well-known passages 47 in the clutch plate 42 into an annular serpentine fluid shear zone 48 formed by the grooves or spaces between interleaved concentric annular ridges or lands 49 formed in a rear face of a clutch plate 42 and complementary concentric annular ridges or lands 50 formed on an interior surface of the main body 18.

Fluid sheared in the shear zone 48 transmits input torque from the rotatably driven clutch plate 42, centrally splined on shaft 15, to provide for the hydraulic drive of main body 18 and the attached bladed fan 26 for cooling fan operation. Due to slippage between the clutch plate 42 and the main body 18, the fan speed is always less than the input speed from the shaft 15.

A reservoir 52 formed between the cover plate 30 and the pump plate 38 contains a specified quantity of viscous fluid. The opening and closing of the gates 40 to control the supply of the fluid into the collecting chamber 41 is provided by a valve plate 54 that extends from driving connection with a center shaft 56 rotatably mounted in a tubular hub portion 58 formed in the central portion of the cover plate 30. A bearing sleeve 60 receives center shaft 56 and makes peripheral contact with the inner wall of the hub portion 58 to prevent fluid leakage to the exterior of the assembly 14.

In FIG. 2, fluid indicated by directional arrow 69A, is forced radially outwardly by centrifugal forces and exits the shear zone 48 into a receiving chamber 66 formed by the pump plate 38, the clutch plate 42 and the divider ring 43. Fluid, indicated by directional arrow 69B, in the receiving chamber 66 is returned to the reservoir 52 through a plurality of orifices 68 provided in a portion of the pump plate 38 in communication with the receiving chamber 66. The return of fluid from the receiving chamber 66 to the reservoir 52 is well-known and described in U.S. Pat. No. 4,741,421 and hereby incorporated by reference.

An electromagnetic control assembly, indicated generally at 70, is fitted within a cavity 63 surrounding the hub portion 58. Control assembly 70 includes a ferromagnetic shuttle barrel 72 mounted for sliding movement in a hollow cylindrical portion 74 of a cap 76. Cap 76 is removably secured to cover plate 30 by fasteners 78. Preferably, the outer diameter of shuttle barrel 72 is complementary to the inner diameter of the hollow cylindrical portion 74.

Central shaft 56 is mounted at its first end to valve plate 54 in any suitable manner. As illustrated best in FIG. 3, shaft 56 is provided with a chamfered second end 80 illustrated as a square cross section. As shaft 56 rotates, valve plate 54 is rotated to cover or uncover gates 40 in pump plate 38 as described above.

The shuttle barrel 72 includes a central opening 82 having a complementary cross section for receiving the chamfered end 80 of central shaft 56. When the chamfered end 80 is fitted within opening 82, rotation of the shuttle barrel 72 is transmitted through the chamfered end 80 to cause rotation of the central shaft 56.

A stepped portion 84 of a reduced outer diameter is provided on shuttle barrel 72. A pair of grooves 86A and 86B are provided on the outer circumference of the stepped portion 84.

An adapter 90 having a flange 92 and a cylindrical portion 94 is mounted in the control assembly 70. Flange 92 is held in place against cover plate 30 by a shoulder 96 on the cap 76. The stepped portion 84 of the shuttle barrel 72 is slidably received in the cylindrical portion 94 of the adapter 90. A pair of screw pins 98A and 98B are threaded into openings in the cylindrical portion 94 and received by respective grooves 86A and 86B in the stepped portion 84.

A coil spring 100 is received in a dwell 102 in the shuttle barrel and fitted over the chamfered end 80 of the central shaft 56. A seat 104 is provided on an inner surface of cap 76 to receive the opposite end of the spring 100.

An electromagnetic coil 110 connected to a power source (not illustrated) and sensors 112 is mounted adjacent the cover 76. Preferable, the coil 110 encircles the outer end of the cylindrical portion 74 of the cap 76. If desired, a bracket (not illustrated) can be utilized to retain the coil 110 in place.

For use, the central shaft 56 is mounted to the valve plate 54 so that the gates 40 of the pump plate 38 are closed when the coil 110 is not energized. In this position, the spring 100 is not compressed. When engine cooling is required, sensors 112 send a signal to energize the coil 110 through a vehicle electronic control module (not illustrated) to create a magnetic flux in a well-known manner. Shuttle barrel 72 is attracted by the flux and pulled against the spring 100. As the shuttle barrel 72 slides in the cylindrical portion 74 (to the right in the embodiment of FIG. 1), pins 98A and 98B travel in respective grooves 86A and 86B, causing rotation of the shuttle barrel 72, the central shaft 56 and the attached valve plate 54. As described above, rotation of the valve plate 56 open gates 40 of the pump plate 38, resulting in high-speed operation of fan 26 and cooling of the engine.

When engine cooling is not required, sensors 112 through a vehicle electronic control module deenergize coil 110 so that the flux is not created. The spring 100 forces the shuttle barrel 72 to its original position (to the left in the embodiment of FIG. 1), to cause rotation of the shuttle barrel 72, the central shaft 56 and valve plate 54, thereby closing the gates 40 of the pump plate 38.

The grooves 86A and 86B are angularly positioned with respect to the axis of the stepped portion 84 and the control shaft 56 to provide a desired rate of rotation of the shuttle barrel 72. For example, grooves 86A and 86B can be positioned to provide 10 degrees of rotation of the shuttle barrel 72 for each one-quarter inch of axial travel of the shuttle barrel 72 in the cylindrical portion 74 of the cap 76.

Although the present invention has been described with reference to a preferred embodiment, workers skilled in the art will recognize that changes may be made in form and detail without departing from the spirit and scope of the invention.

The embodiments of the invention in which an exclusive property or privilege is claimed are defined as follows:

1. An electromagnetic control assembly for a viscous fluid clutch assembly having a rotatable valve plate for controlling the flow of fluid to a shear zone, the control assembly comprising:

(a) a shaft connected to the valve plate;
(b) a ferromagnetic element slidably mounted on the shaft and connected to the shaft so that rotation of the ferromagnetic element is transferred to the shaft;
(c) means for creating a magnetic flux mounted adjacent the ferromagnetic element; and
(d) means for rotating the ferromagnetic element as it slides to the flux.

2. An electromagnetic control assembly for a viscous fluid clutch assembly having a rotatable valve plate for controlling the flow of fluid through a pump plate, the control assembly comprising:
(a) a ferromagnetic element slidably mounted in a cylindrical member having a closed end;
(b) spring means provided between the ferromagnetic element and the closed end of the cylindrical member;
(c) a rotatable shaft mounted at its first end to the valve plate and having chamfer at its second end;
(d) an opening provided in the ferromagnetic element for receiving and fitting the chamfered end of the shaft;
(f) electromagnetic means for creating a flux adjacent the closed end of the cylindrical member and attracting the ferromagnetic element against the spring; and
(g) means for rotating the ferromagnetic element as it is attracted by the flux.

3. The control assembly as specified in claim 2 wherein the means for rotating the ferromagnetic member comprises:
(a) at least one groove in the outer surface of the ferromagnetic element angularly oriented with respect to the axis of the cylindrical member, and
(b) pin means provided in the cylindrical member and received in the groove.

4. A method for controlling the speed of a fan attached to a viscous fluid clutch assembly wherein the clutch assembly includes a rotatable valve plate for controlling the flow of fluid to a shear zone, the method comprising the steps of:
(a) securing a rotatable shaft to the valve plate;
(b) slidably mounting a ferromagnetic element to the shaft so that rotation of the element is transferred to the shaft;
(c) providing means for creating a magnetic flux adjacent the ferromagnetic element;
(d) energizing the magnetic flux means to attract the ferromagnetic element, and
(e) rotating the ferromagnetic element as it slides to the flux, thereby rotating the shaft and opening the valve plate.

* * * * *